Patented Dec. 19, 1950

2,534,239

UNITED STATES PATENT OFFICE 2,534,239

8-HALOXANTHINE SALTS OF DIARYLALKYL-AMINES AND THE PRODUCTION THEREOF

John W. Cusic, Skokie, Ill., assignor to G. D. Searle & Co., Chicago, Ill., a corporation of Illinois No Drawing. Application July 2, 1949, Serial No. 102,958

14 Claims. (Cl. 260—253)

This invention relates to compositions of matter comprising halogenated xanthines and organic bases of the general formula $$Ar_2CH—Alk—B$$

wherein Ar is an aromatic hydrocarbon radical, preferably phenyl; Alk is a lower alkylene radical such as ethylene or propylene; and B is a di(lower alkyl)amino radical such as dimethyl-, diethyl-, or dipropylamino or an aliphatic-type heterocyclic radical such as N-piperidino and N-morpholino. More particularly this invention relates to salts of 8-haloxanthines which contain a hydrogen atom in position 7 and organic bases of the foregoing formula, as well as to processes for preparing such salts.

It is known that bases of the foregoing type elicit certain undesirable side reactions and toxic manifestations following administration as medicinal agents. Most common of these effects are drowsiness, dizziness, and in certain instances nausea.

It is the object of this invention to produce therapeutic compositions of matter which are relatively free from untoward reactions. Another object is to produce compositions of reduced toxicity. A further object is to produce preparations having enhanced therapeutic activity. Other objects will be apparent to those skilled in the art.

In view of the following disclosure, I have discovered that salts of 8-haloxanthines which contain a hydrogen atom in position 7 with organic bases of the type disclosed hereinabove produce little effect on the central nervous system and are therapeutically more useful than either of the individual components alone. Further such salts appear to exert a potentiating effect and have enhanced activity. Such compounds are useful in the treatment of allergic manifestations, as well as for the treatment and suppression of undesirable side effects commonly observed in the use of common antihistaminic drugs.

Among the halogenated xanthines to which this invention pertains are the chloro, bromo, and iodo derivatives of theophylline, and related xanthines which have a hydrogen atom in position 7.

In particular this invention is concerned with acidic xanthines such as 8-chlorotheophylline
8-bromotheophylline
8-chloroxanthine
3-methyl-8-chloro-
  xanthine
8-bromoxanthine
3-methyl-8-bromo-
  xanthine 1,3-diethyl-8-bromo-
  xanthine
1,3-diethyl-8-chloro-
  xanthine
8-iodotheophylline
8-iodo-1,3-diethyl-
  xanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the organic base are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid organic base and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the organic base. During the heating, ammonia is evolved and the haloxanthine salt of the organic base is formed. On chilling this salt precipitates.

The following examples illustrate in more detail my invention, but in no way are to be construed as limiting it in spirit or in scope.

Example 1

To a freshly prepared solution of n-butyllithium made in 650 cubic centimeters of anhydrous ether from 139 grams of n-butyl chloride and 21 g. of lithium are added 84 g. of diphenylmethane over a period of 20 minutes. The reaction is sufficiently exothermic to cause gentle refluxing of the reaction mixture. Then 72 g. of β-dimethylaminoethyl chloride hydrochloride are added over a period of 20 minutes with good agitation. The resulting mixture is refluxed and stirred for 3 hours. It is then filtered and the filtrate is extracted with dilute hydrochloric acid. The acid extract is made basic with 40% caustic soda solution and extracted with ether. The ether extract is washed well with water, dried with anhydrous sodium sulfate, filtered and evaporated. The residue of 3,3-diphenyl-1-dimethylaminopropane distills in the range of 178–183° centigrade at 18 mm. pressure. On cooling, it forms a low-melting crystalline solid. It has the formula

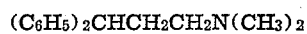

Example 2

10 g. of 3,3-diphenyl-1-dimethylaminopropane and 8 g. of 8-chlorotheophylline are dissolved in a hot mixture of 50 cc. of methyl ethyl ketone and 10 cc. of water. The hot solution is decanted to remove any residual solid and is evaporated on the steam bath. The residue of the 8-chlorotheophylline salt is crystallized from ethyl acetate. The 8-chlorotheophylline salt of 3,3-diphenyl-1-dimethylaminopropane melts at 113–115° C.

*Example 3*

22 g. of 3,3-diphenyl-1-N-piperidinopropane, which has the formula

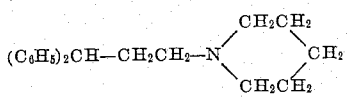

and 16 g. of 8-chlorotheophylline are dissolved in a boiling mixture of 110 cc. of methyl ethyl ketone and 20 cc. of water. The hot solution is filtered and evaporated on the steam bath. The residue of the 8-chlorotheophylline salt of 3,3-diphenyl - 1 - N - piperidinopropane is separated, triturated with cold acetone and dried at 60–65° C.

I claim:

1. An 8-haloxanthine salt of an organic base of the formula $(C_6H_5)_2CH\text{-Alk-B}$ wherein Alk is a lower alkylene radical and B is a tertiary amino radical of the group consisting of di(lower alkyl)amino and six-membered saturated heterocyclic radicals wherein nitrogen is the sole hetero element and the heterocyclic amino radical is linked to Alk through nitrogen, and wherein the 8-haloxanthine contains a hydrogen atom in position 7.

2. An 8-haloxanthine salt of an organic base of the formula $(C_6H_5)_2CH\text{-Alk-Z}$ wherein Alk is a lower alkylene radical and Z is a six-membered saturated heterocyclic radical wherein nitrogen is the sole hetero element, attached to Alk through nitrogen, and wherein the 8-haloxanthine contains a hydrogen atom in position 7.

3. An 8-haloxanthine salt of an organic base of the formula

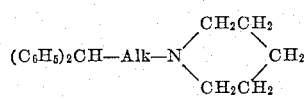

wherein Alk is a lower alkylene radical, and wherein the 8-haloxanthine contains a hydrogen atom in position 7.

4. An 8-halotheophylline salt of an organic base of the formula

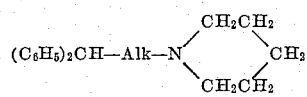

wherein Alk is a lower alkylene radical.

5. An 8-halotheophylline salt of an organic base of the formula

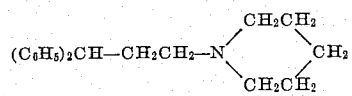

6. The 8-chlorotheophylline salt of 3,3-diphenyl-1-N-piperidinopropane.

7. An 8-haloxanthine salt of an organic base of the formula $(C_6H_5)_2CH\text{-Alk-NR}_2$ wherein Alk is a lower alkylene radical and R is a lower alkyl radical, and wherein the 8-haloxanthine contains a hydrogen atom in position 7.

8. An 8-haloxanthine salt of an organic base of the formula $(C_6H_5)_2CH\text{-Alk-N(CH}_3)_2$ wherein Alk is a lower alkylene radical, and wherein the 8-haloxanthine contains a hydrogen atom in position 7.

9. An 8-halotheophylline salt of an organic base of the formula $(C_6H_5)_2CH\text{-Alk-N(CH}_3)_2$ wherein Alk is a lower alkylene radical.

10. An 8-halotheophylline salt of an organic base of the formula $(C_6H_5)_2CH\text{-CH}_2CH_2\text{-N(CH}_3)_2$ 11. The 8-chlorotheophylline salt of 3,3-diphenyl-1-dimethylaminopropane.

12. The process of producing an 8-haloxanthine salt of an organic base of the formula $(C_6H_5)_2CH\text{-Alk-B}$ wherein Alk is a lower alkylene radical and B is a tertiary amino radical of the group consisting of di(lower alkyl)amino and six-membered saturated heterocyclic radicals which contain nitrogen as the sole hetero element and which are linked to Alk through nitrogen, which comprises mixing equivalent quantities of said organic base and a member of the group consisting of an 8-haloxanthine which contains a hydrogen atom in position 7 and the ammonium salt thereof, dissolving the mixture in a hot water-soluble organic solvent, and separating the salt thus formed.

13. The process of claim 12 wherein the organic solvent is methyl ethyl ketone.

14. The process of producing the 8-chlorotheophylline salt of 3,3-diphenyl-1-dimethylaminopropane which comprises mixing equivalent quantities of 8-chlorotheophylline and 3,3-diphenyl-1-dimethylaminopropane, dissolving the mixture in hot aqueous methyl ethyl ketone, removing the solvent and crystallizing the residual salt from ethyl acetate.

JOHN W. CUSIC.

No references cited.